(12) United States Patent
Bacic et al.

(10) Patent No.: US 10,605,107 B2
(45) Date of Patent: Mar. 31, 2020

(54) TIP CLEARANCE CONTROL SYSTEM

(71) Applicant: ROLLS-ROYCE PLC, London (GB)

(72) Inventors: Marko Bacic, Oxford (GB); Glenn A Knight, Derbyshire (GB)

(73) Assignee: ROLLS-ROYCE plc, London (GB)

(*) Notice: Subject to any disclaimer, the term of this patent is extended or adjusted under 35 U.S.C. 154(b) by 228 days.

(21) Appl. No.: 15/620,024

(22) Filed: Jun. 12, 2017

(65) Prior Publication Data
US 2017/0370242 A1   Dec. 28, 2017

(30) Foreign Application Priority Data

Jun. 27, 2016 (GB) .................................. 1611104.9

(51) Int. Cl.
| | | |
|---|---|---|
| *F01D 11/20* | (2006.01) | |
| *B64D 27/10* | (2006.01) | |
| *F02C 7/18* | (2006.01) | |
| *F01D 11/24* | (2006.01) | |
| *B64D 13/02* | (2006.01) | |
| *B64D 13/08* | (2006.01) | |
| *B64D 27/16* | (2006.01) | |
| *F02C 6/08* | (2006.01) | |

(Continued)

(52) U.S. Cl.
CPC .............. *F01D 11/20* (2013.01); *B64D 13/02* (2013.01); *B64D 13/08* (2013.01); *B64D 27/10* (2013.01); *B64D 27/16* (2013.01); *F01D 11/24* (2013.01); *F02C 6/08* (2013.01); *F02C 7/185* (2013.01); *B64D 13/006* (2013.01); *B64D 2013/003* (2013.01); *B64D 2013/0603* (2013.01); *F05D 2220/323* (2013.01); *F05D 2240/307* (2013.01); *F05D 2260/213* (2013.01); *Y02T 50/671* (2013.01)

(58) Field of Classification Search
CPC ........ B64D 13/02; B64D 13/08; B64D 27/16; F01D 11/20; F01D 11/24
See application file for complete search history.

(56) References Cited

U.S. PATENT DOCUMENTS

| | | |
|---|---|---|
| 4,928,240 A | 5/1990 | Davison et al. |
| 5,039,281 A | 8/1991 | Johnston |
| 5,136,837 A | 8/1992 | Davison |

(Continued)

FOREIGN PATENT DOCUMENTS

| | | |
|---|---|---|
| EP | 0 974 515 A2 | 1/2000 |
| EP | 1 136 679 A2 | 9/2001 |

(Continued)

OTHER PUBLICATIONS

Oct. 19, 2017 European Search Report issued in Patent Application No. 17175453.

(Continued)

*Primary Examiner* — Kevin A Lathers
(74) *Attorney, Agent, or Firm* — Oliff PLC

(57) ABSTRACT

A gas turbine engine is disclosed having a tip clearance control system. The tip clearance control system has a cabin blower system, a casing arranged in use about a rotor of a gas turbine engine and a fluid delivery passage. The cabin blower system having a cabin blower compressor arranged in use to compress fluid used in a cabin of an aircraft and to compress fluid conducted via the fluid delivery passage into heat exchange with the casing.

15 Claims, 4 Drawing Sheets

(51) Int. Cl.
*B64D 13/00* (2006.01)
*B64D 13/06* (2006.01)

(56) References Cited

U.S. PATENT DOCUMENTS

| | | | | |
|---|---|---|---|---|
| 8,126,628 B2* | 2/2012 | Hershey | ............... | F01D 11/24 |
| | | | | 244/75.1 |
| 8,257,217 B2* | 9/2012 | Hoffman | ............ | F16H 37/086 |
| | | | | 475/216 |
| 2006/0277920 A1* | 12/2006 | Bart | .................... | F02C 7/32 |
| | | | | 60/793 |
| 2010/0139288 A1 | 6/2010 | Rago | | |

FOREIGN PATENT DOCUMENTS

| | | |
|---|---|---|
| EP | 2 829 706 A1 | 1/2015 |
| EP | 3 034 405 A1 | 6/2016 |
| GB | 2242235 A | 9/1991 |

OTHER PUBLICATIONS

Nov. 28, 2016 Great Britain Search Report issued in Patent Application No. 1611104.9.

\* cited by examiner

US 10,605,107 B2

TIP CLEARANCE CONTROL SYSTEM

The present disclosure concerns gas turbine engines having tip clearance control systems, aircraft having such engines and methods of operating those aircraft.

Tip clearance control systems for both gas turbine engine compressors and turbines are known. One form of tip clearance control is based on providing cooling air in a heat exchange relationship with a casing surrounding the relevant rotor. The air is used to selectively control the thermal growth of the casing, thereby controlling the clearance between blade tips and the casing, particularly during transient operation. In conventional turbofan tip clearance control systems, the cooling air is bled from the bypass duct and delivered to the casing. This can however provide a significant design constraint, since the pressure ratio available can be marginal in terms of adequate supply for case cooling. To compensate larger cross-section conduits, valves and manifolds are used with a view to minimising the pressure drop and thereby preserving pressure for adequate air delivery volume to the casing. These larger components add weight.

According to a first aspect there is provided a gas turbine engine comprising:
 a tip clearance control system having a casing arranged about a rotor of a gas turbine engine and a fluid delivery passage; and
 a cabin blower system having a cabin blower compressor;
 wherein the output of the cabin blower compressor is coupled to and arranged to deliver fluid to the fluid delivery passage and to a cabin of an aircraft.

According to another aspect there is provided a gas turbine engine comprising a tip clearance control system, the tip clearance control system comprising a cabin blower system, a casing arranged in use about a rotor of a gas turbine engine and a fluid delivery passage, the cabin blower system comprising a cabin blower compressor arranged in use to compress fluid used in a cabin of an aircraft and to compress fluid conducted via the fluid delivery passage into heat exchange with the casing.

Cabin blower systems are used to pressurise the cabins of aircraft. Cabin blowers are typically driven by one or more associated gas turbine engines of the aircraft. The gas turbine engine may be used to drive a cabin blower compressor in a number of ways (e.g. using electrical power generated by the engine or mechanically).

Cabin blower systems are typically designed with significant over-capacity in terms of the requirements of the cabin environmental control system. This is in order that cabin pressurisation can be maintained by an operational cabin blower system in the event of failure of the cabin blower system of another engine (or indeed failure of that engine itself). By utilising this over capacity the pressure available for tip clearance control cooling may be increased by comparison (for instance) with air bled from a bypass duct downstream of a fan and not further compressed. This may also allow a reduction in the size and weight of passages used for delivery of the fluid because larger pressure drops may be accommodated before there is insufficient pressure for adequate fluid delivery to the casing. Further any flow volume control functionality provided for cabin blower compressor control may also be usable for controlling flow volume to the casing for cooling. Furthermore passages used for the delivery of fluid for cabin supply and tip clearance control uses may be partially shared, reducing weight and positively affecting installation options.

The rotor of the first aspect may be a compressor or a turbine, may be a bladed disc or bladed ring and may comprise a drum pack of multiple stages.

In some embodiments the tip clearance control system comprises a fluid supply passage between a blower fluid collection inlet and the cabin blower compressor for delivering fluid to the cabin blower compressor. The blower fluid collection inlet may for example comprise a scoop which, where the gas turbine engine is a turbofan, may be provided in the bypass duct downstream of the fan. More specifically the blower fluid collection inlet may be provided on an outer wall of the bypass duct.

In some embodiments the cabin blower compressor may be driven by a spool of the gas turbine engine. The drive may be delivered via an accessory gearbox and/or via an electrical motor powered by a generator driven by the spool and/or via a hydraulic drive.

In some embodiments the speed of rotation of the cabin blower compressor is controlled via a transmission. The transmission may be provided within a drive path between the accessory gearbox and the cabin blower compressor. The transmission may be a continuously variable transmission and specifically a toroidal continuously variable transmission. Such a means of varying the speed of the drive delivered to the cabin blower compressor may be desirable at least in respect of the cabin pressurisation element of the tip clearance control system functionality. Specifically it may not be desirable for the cabin air flow and pressure to be determined by the particular operating point of the gas turbine at any particular moment. Where such a transmission is provided it may be used to control the speed of the cabin blower compressor and thereby the flow volume supplied to an environmental control system for cabin supply use. Thus regardless of engine operating point and ambient air pressure the cabin flow and pressure can be maintained within acceptable limits. In the present embodiment however, the transmission may also be used to control the flow volume supplied to the casing for tip clearance control. This may negate the need for two separate flow volume control mechanisms, one for each of the cabin blower and tip clearance control functions.

In some embodiments the toroidal continuously variable transmission comprises at least one traction drive adapted to transmit drive therethrough; the traction drive comprising first and second toroids, the first and second toroids each having one of a pair of opposed toroidal surfaces and there being a set of rotatable variators disposed between the opposed toroidal surfaces and where further the first and second toroids are separated and are drivingly engaged via a wheel of each variator, each wheel running in use on both of the opposed toroidal surfaces.

In some embodiments the transmission further comprises a bypass drive transmission parallel to the toroidal continuously variable transmission. The toroidal continuously variable transmission may be a relatively inefficient way of delivering all drive. Thus if a direct bypass drive transmission is also provided, the toroidal continuously variable transmission may be principally used to vary the output of the direct drive. In this way the transmission efficiency may be increased.

In some embodiments the transmission is arranged to combine drive from the toroidal continuously variable transmission and the bypass drive transmission and deliver it to the cabin blower compressor. It may be for example that the drive is combined in a differential planetary gearbox.

In some embodiments the tip clearance control system comprises a controller arranged to control the transmission to determine the rate at which the cabin blower compressor is driven in accordance with the requirements for cabin pressurisation and tip clearance control cooling. The controller may be a processor of the gas turbine engine (e.g. its engine electronic controller). Demands for cabin pressurisation may be made by a processor on an associated aircraft whereas demands for tip clearance control cooling may be made by the engine processor (e.g. the engine electronic controller). It may be that compromise logic is employed where the cabin blower rotation rate demanded is different. The logic may for instance require that the highest demanded rotation rate wins.

In some embodiments the transmission is the sole control mechanism for flow volume delivered to the casing. It may be for instance that there is no tip clearance control modulating valve providing a further control mechanism. By utilising the transmission principally provided to vary the flow volume delivered for cabin supply to also control tip clearance control flow volume, weight may be saved. Further cooling nozzles of a manifold supplied with fluid by the fluid delivery passage may be sized to suit casing cooling requirements at cruise of the aircraft.

In some embodiments a tip clearance control modulating valve is provided in the fluid delivery passage. The provision of the tip clearance control modulating valve may improve the flow volume control to the casing. It may further reduce the degree of compromise required in acting upon cabin supply and tip clearance control demands in terms of transmission control and therefore cabin blower rotation speed. The tip clearance control modulating valve may provide simple on/off functionality or additional variability e.g. continuously variable. Control of the tip clearance control modulating valve may be performed by the controller.

In some embodiments the tip clearance control system comprises an injector having a motive fluid port, an entrained fluid port and an outlet port, where the injector forms part of the fluid delivery passage and is connected to an upstream portion thereof at its motive fluid port and to a downstream portion thereof at its outlet port and where further an entrained fluid passage connects the entrained fluid port and an entrained fluid collection inlet. The entrained fluid collection inlet may for example comprise a scoop which, where the gas turbine engine is a turbofan, may be provided in the bypass duct downstream of the fan. More specifically the entrained fluid collection inlet may be provided on an outer wall of the bypass duct.

In some embodiments the tip clearance control system comprises a heat exchanger arranged to cool the fluid delivered to the casing. The heat exchanger may for instance be located within the fluid delivery passage and may provide heat exchange between fluid compressed by the cabin blower compressor destined for the casing and a heat sink such as aircraft fuel or bypass duct air. The heat exchanger may mitigate an increase in the fluid temperature brought about by its compression by the cabin blower compressor.

In some embodiments the gas turbine engine is a turbofan.

In some embodiments the blower fluid collection inlet is provided in the bypass duct downstream of the fan. Where present the entrained fluid collection inlet may also be provided in the bypass duct downstream of the fan.

In some embodiments the fluid is air.

According to a second aspect there is provided an aircraft comprising a gas turbine engine according to the first aspect.

In some embodiments the aircraft comprises at least two gas turbine engines according to the first aspect.

In some embodiments the aircraft comprises at least one inter-engine duct via which fluid compressed by the cabin blower compressor of one of the engines is selectively deliverable to the tip clearance control system of another of the engines. Specifically the fluid may be deliverable to the casing of another of the engines. In this way, if there is a cabin blower compressor failure of one engine, tip clearance cooling control may be maintained for that engine by providing cabin blower compressor fluid from another engine.

According to a third aspect there is provided a method of operating an aircraft, the aircraft comprising at least two gas turbine engines according to the first aspect and at least one inter-engine duct via which fluid compressed by the cabin blower compressor of one of the engines is selectively deliverable to the tip clearance control system of another of the engines, the method comprising, delivering fluid from one of the engines having an operational cabin blower compressor to the casing of the other engine via the inter-engine duct when the cabin blower compressor of that other engine is operating sub-normally and/or is inoperative.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

Embodiments will now be described by way of example only, with reference to the Figures, in which.

Figure 1:
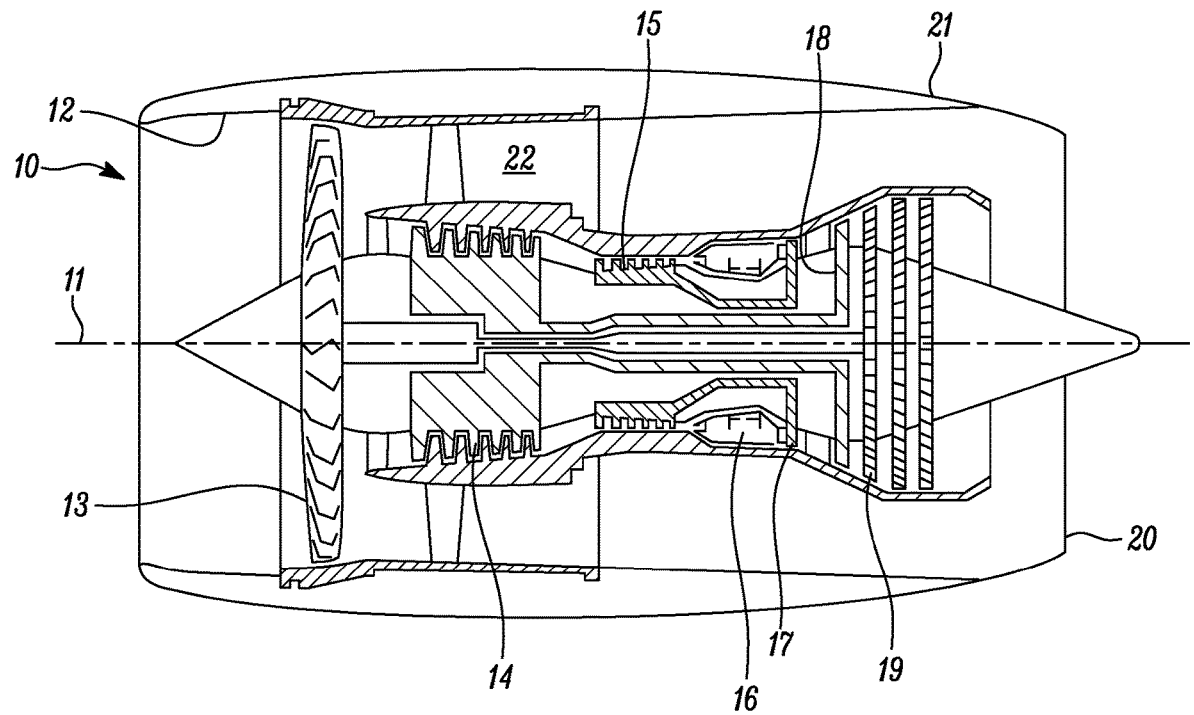
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Figure 2:
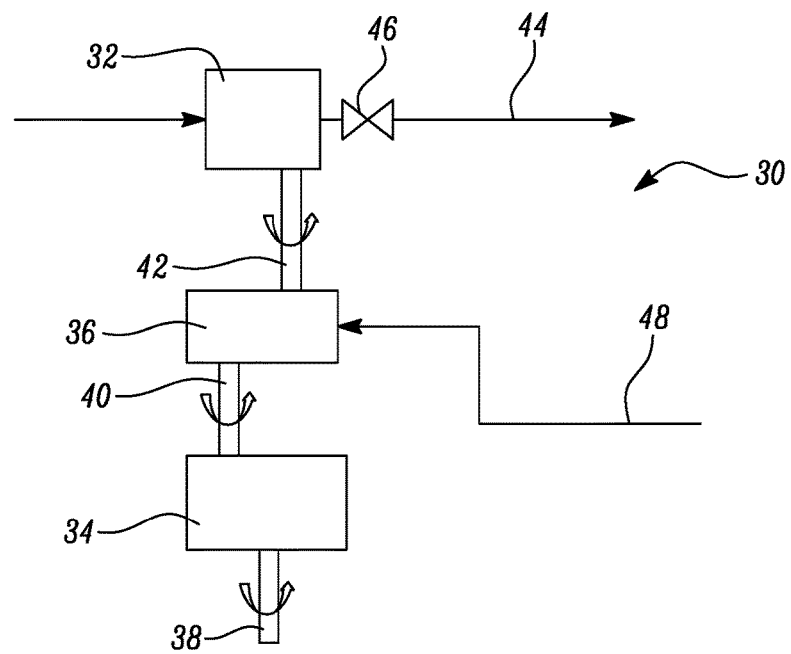
FIG. 2 is a schematic view of a cabin blower system in accordance with an embodiment of the invention.

Referring now to FIG. 2 an aircraft cabin blower system is generally provided at 30.

The cabin blower system 30 has a shaft of a gas turbine engine (not shown) and a cabin blower compressor 32 connected in a driving relationship. In the drive path intermediate the gas turbine engine shaft and cabin blower compressor 32 are an accessory gearbox 34 of the gas turbine engine and a transmission 36. The shaft of the gas turbine engine and the accessory gearbox 34 are drivingly coupled by an accessory gearbox shaft 38. The accessory gearbox 34 and transmission 36 are drivingly coupled by an intermediate shaft 40. The transmission 36 and cabin blower compressor 32 are drivingly coupled by a compressor shaft 42. As will be appreciated, in other embodiments variations to the arrangement above are possible. It may be for instance that the accessory gearbox 34 could be omitted from the drive path and the intermediate shaft 40 drivingly coupling the transmission 36 directly to the shaft of the gas turbine engine.

The cabin blower compressor 32 is disposed in a duct system 44 connecting a scoop (not shown) on an outer wall of a bypass duct (not shown) of the gas turbine engine and aircraft cabin air conditioning outlets (not shown). Between the cabin blower compressor 32 and air conditioning outlets in the duct system 44 is a starter air shut off valve 46. The shut-off valve 46 is arranged to be operable to alternatively allow one of two conditions. In a first condition the valve 46 permits the flow of air from the cabin blower compressor 32 towards the air conditioning outlets and seals communication between the duct system 44 and a starter conduit (not shown). The starter conduit connects the duct system 44 at the location of the valve 46 and a port to atmosphere. In a second condition the valve 46 permits flow from the starter conduit towards the cabin blower compressor 32 and prevents flow towards the air conditioning outlets.

Between the cabin blower compressor 32 and the valve 46 is an array of variable exit guide vanes (not shown) disposed immediately adjacent the cabin blower compressor 32.

The system 30 has both a forward and a reverse configuration which in use allow the system 30 to perform as a cabin blower or as part of a starter system for the gas turbine engine respectively.

In the forward configuration the cabin blower compressor 32 is driven by the gas turbine engine shaft via the accessory gearbox shaft 38; the accessory gearbox 34, the intermediate shaft 40, the transmission 36 and the compressor shaft 42. The cabin blower compressor 32, driven by the gas turbine engine shaft, compresses air collected by the scoop and delivered to the cabin blower compressor 32 via the duct system 44. This compressed air is conditioned by the variable exit guide vanes, positioned accordingly, to convert radial velocity kinetic energy of the air into higher static pressure, allowing it to be turned with less loss. The variability of the exit guide vanes means that a wider range of air flow rates, velocities and pressures can be effectively conditioned. Thereafter the air is delivered by the duct system 44 for regulated use in the cabin of the aircraft via the air conditioning outlets. The starter air shut-off valve 46 is placed in its first condition so as to permit flow towards the air conditioning outlets and to prevent losses to atmosphere via the starter conduit. The rate at which the cabin blower compressor 32 is driven is controlled via the transmission 36, the gearing of which is controlled via a control signal 48 from a controller (not shown).

In the reverse configuration the cabin blower compressor 32 acts as a turbine and drives the gas turbine engine shaft via the compressor shaft 42, transmission 36, intermediate shaft 40, accessory gearbox 34 and accessory gearbox shaft 38. The cabin blower compressor 32 is driven by gas (typically air) supplied from an external source via the starter conduit. With the valve 46 in its second condition gas supplied by the external source is supplied to the cabin blower compressor 32 in order to drive it, while losses to the air conditioning outlets are prevented. The variable exit guide vanes, positioned accordingly, are used to direct the gas delivered via the starter conduit so as to encourage efficient driving of the cabin blower compressor 32 in the opposite direction to its rotation when the system 30 is operating in the forward configuration. Furthermore the transmission 36 is adjusted so that despite the rotation of the cabin blower compressor 32 in the opposite direction to that when the system 30 is operated in the first configuration, the drive direction delivered to the shaft of the gas turbine engine is common to the direction of rotation of the same shaft when the system 30 is operated in the first configuration.

Figure 3:
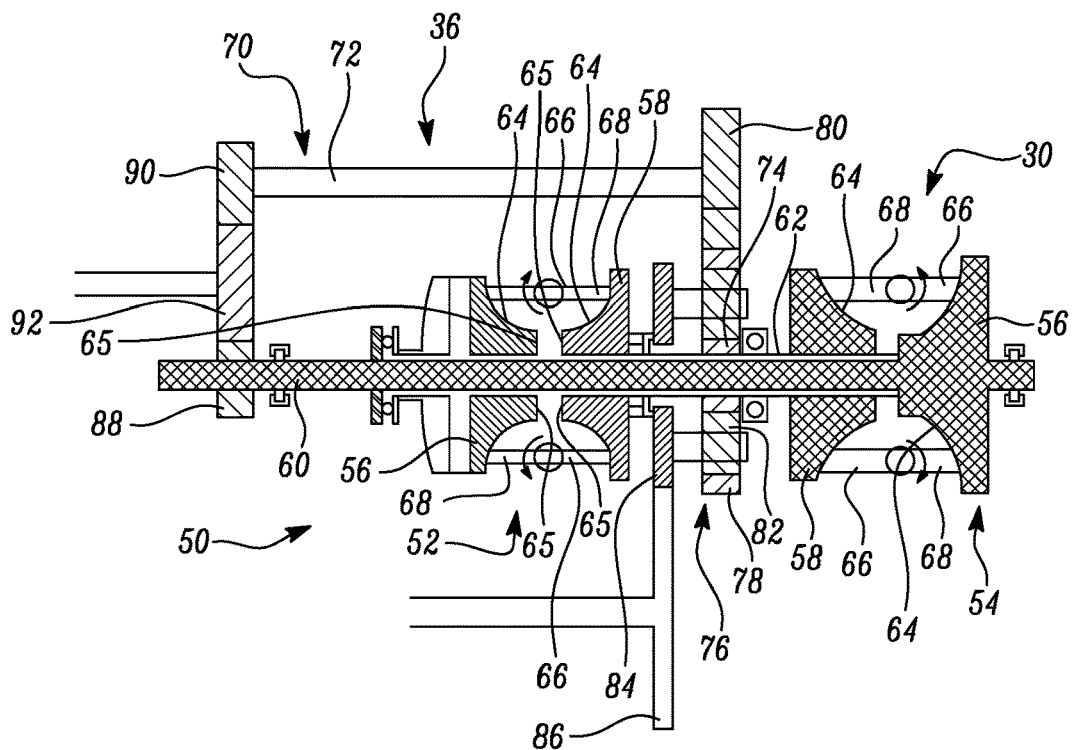
FIG. 3 is a cross-sectional view of a transmission in accordance with an embodiment of the invention shown in a forward configuration.
Figure 4:
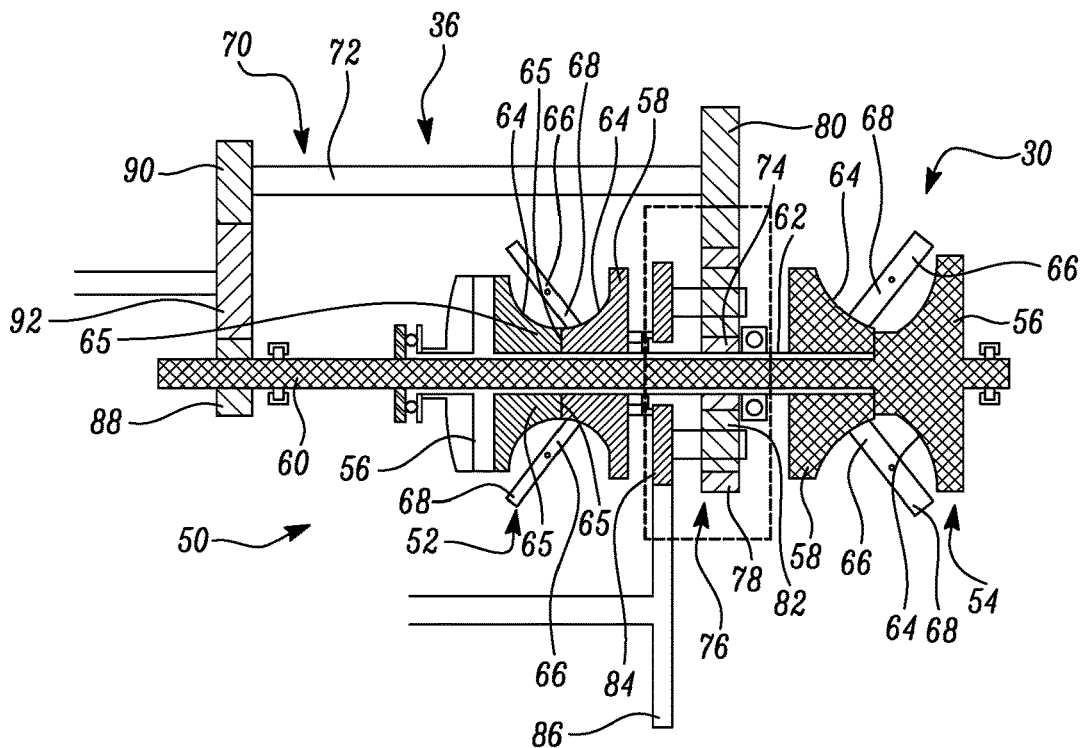
FIG. 4 is a cross-sectional view of the transmission of FIG. 3 shown in a reverse configuration.

Referring now to FIGS. 3 and 4 the transmission 36 and in particular its first (FIG. 3) and second (FIG. 4) configurations are described in more detail.

The transmission 36 has a toroidal continuously variable transmission (CVT) generally provided at 50. The toroidal CVT 50 has first 52 and second 54 traction drives. Each traction drive 52, 54 has first 56 and second 58 toroids. The first toroid 56 of each traction drive 52, 54 is provided on and surrounds a first transmission shaft 60. The second toroid 58 of each traction drive 52, 54 is provided on and surrounds a second transmission shaft 62. The first 60 and second 62 transmission shafts are coaxial and the first transmission shaft 60 passes through the second transmission shaft 62. The first transmission shaft 60 is longer than the second transmission shaft 62 in order to accommodate the first toroids 56 provided thereon.

The first 56 and second 58 toroids of each traction drive 52, 54 define a pair of opposed toroidal surfaces 64 and a pair of opposed parallel engagement surfaces 65. Disposed between the opposed toroidal surfaces 64 of each traction drive 52, 54 are a set of rotatable variators 66 (two per traction drive 52, 54 shown). Each variator 66 has a wheel 68 capable of simultaneously engaging and running on the opposed toroidal surfaces 64 of the respective traction drive 52, 54. Each variator 66 is also rotatable about an axis so as to vary the diameter at which the wheel 68 engages each of the opposed toroidal surfaces 64, increasing the diameter for one and reducing it for the other of the opposed toroidal surfaces 64. Each variator 66 is also rotatable to a degree such that the wheel 68 no longer engages one of the opposed toroidal surfaces 64.

The transmission 36 also has a bypass drive transmission 70 having a bypass transmission shaft 72. The bypass transmission shaft is non-coaxial with the first 60 and second 62 transmission shafts and is radially displaced therefrom.

The bypass transmission shaft 72 is however parallel to the first 60 and second 62 transmission shafts.

Provided on the second transmission shaft 62 is a first gear of the transmission 74. The first gear 74 is a sun gear of a differential planetary gearbox 76. A ring gear 78 of the gearbox 76 is engaged with a second gear of the transmission 80 provided on the bypass transmission shaft 72. Between and engaged with the sun gear (first gear 74) and ring gear 78 are a plurality of planet gears 82 supported by a planet carrier gear 84. The planet carrier gear 84 is engaged with a compressor gear 86 of the compressor shaft 42. Consequently the planet carrier gear 84 is engaged with the compressor 36. As will be appreciated, in alternative embodiments the first gear 74, second gear 80 and compressor gear 86 may be or may be engaged with alternative of the gears of the differential planetary gearbox 76 mentioned. Indeed each possible combination is considered in order that increased design freedom is available in terms of selecting fundamental gear ratios.

A third gear of the transmission 88 is provided on the first transmission shaft 60 and a fourth gear of the transmission 90 is provided on the bypass transmission shaft 72. The third gear 88 and fourth gear 90 both engage a common gear 92 provided on the intermediate shaft 40. Both the first transmission shaft 60 and bypass transmission shaft 72 are therefore engaged to the shaft of the gas turbine engine.

Referring specifically now to FIG. 3, the transmission 36 is shown in the forward configuration. In the forward configuration the first 56 and second 58 toroids of each traction drive 52, 54 are axially separated and the wheels 68 of each variator 66 engage both respective opposed toroidal surfaces 64. Consequently the opposed parallel engagement surfaces 65 are axially separated and therefore non-engaged. Power is delivered to the transmission 36 from the shaft of the gas turbine engine via the intermediate shaft 40 and common gear 92. This drives both the first transmission shaft 60 and bypass transmission shaft 72. The first transmission shaft 60 drives the second transmission shaft 62 via the first 56 and second 58 toroids and the variator wheels 68. The bypass transmission shaft 72 and second transmission shaft 62 provide input drive to the gearbox 76 in opposite directions. Output from the gearbox 76 is via its planet carrier gear 84, via which drive is delivered to the cabin blower compressor 32.

As will be appreciated the rate at which the planet carrier gear 84 spins and therefore the rate at which the compressor 32 is turned will depend on the relative input rates to the gearbox 76 from the bypass transmission shaft 72 and the second transmission shaft 62. These relative rotation rates will determine the combined drive rate outputted via the planet gears 82. Thus because the input from the second transmission 62 is variable in accordance with the rotational position of the variators 66, the rate at which the cabin blower compressor 32 is spun is selectively variable. Control over the rotational position of the variators 66 is in accordance with signals 48 from the controller (not shown). Specifically the signals will determine the position to which the variators 66 are rotated and therefore the diameter of the respective opposed toroidal surfaces 64 at which the wheels 68 engage. The rotation therefore allows adjustment to be made to the gearing between the toroids 56, 58. The signals sent by the controller are in accordance with cabin air conditioning and pressurisation requirements. Because the toroidal CVT 50 is effectively used to modify the drive provided by the bypass drive transmission 70, power transmission may be more efficient than if power was transmitted exclusively via the toroidal CVT 50.

Referring specifically now to FIG. 4, the transmission 36 is shown in the reverse configuration. In the reverse configuration the first 56 and second 58 toroids of each traction drive 52, 54 are in direct engagement via their opposed parallel engagement surfaces 65. As will be appreciated the first 56 and second 58 toroids of each traction drive 52, 54 have been forced together by comparison with their position in the first configuration (FIG. 3). In order to achieve this the variators 66 are rotated so as their wheels 68 no longer engage the first toroid 56 in each traction drive 52, 54 and so as the rotation is sufficient such that the variators 66 would no longer impede the closing of the axial gap between the toroids 56, 58. Thereafter the toroids 56, 58 of each variator 66 are moved together and forced into a resilient engagement at their opposed parallel engagement surfaces 65 by an end load delivery system 94 comprising a hydraulically actuated piston. Power is delivered to the transmission 36 from the cabin blower compressor 32 driven by an external source of gas and acting as a turbine. Power from the cabin blower compressor 32 is delivered via the compressor shaft 42 and compressor gear 86 to the planet carrier gear 84 and into the gearbox 76. The gearbox 76 drives the second transmission shaft 62 and bypass transmission shaft 72. The second transmission shaft 62 drives the first transmission shaft 60 via the rotationally locked toroids 56, 58 of each traction drive 52, 54. The first transmission shaft 60 and bypass transmission shaft 72 drive the gear of the gas turbine engine via the common gear 92 and intermediate shaft 40. In this way the shaft of the gas turbine engine can be turned and air delivered to combustors before fuel is delivered and ignited.

As will be appreciated, after engine start, the system 30 can be returned to the forward configuration for delivering pressurised cabin air by driving the toroids 56, 58 apart using the end load delivery system 94. Thereafter the variators 66 are rotated so as the wheels 68 are orientated for engagement with both opposed toroidal surfaces 64 before the end load delivery system 94 drives the toroids 56, 58 towards each other until the wheels 68 engage both toroids. As will be appreciated, further temporary separation of the toroids 56, 58 by the end load delivery system 94 may be desirable and/or necessary before the variators 66 are re-oriented so as to be primed for engagement of the engagement surfaces 65 and operation of the system 30 in the reverse configuration.

Whilst the cabin blower system 30 and transmission 36 have been described in isolation for simplicity, the aircraft cabin blower system 30 and cabin blower systems similar thereto may be integrated so as to be part of various tip clearance control systems as illustrated below with reference to FIGS. 5-8.

Figure 5:
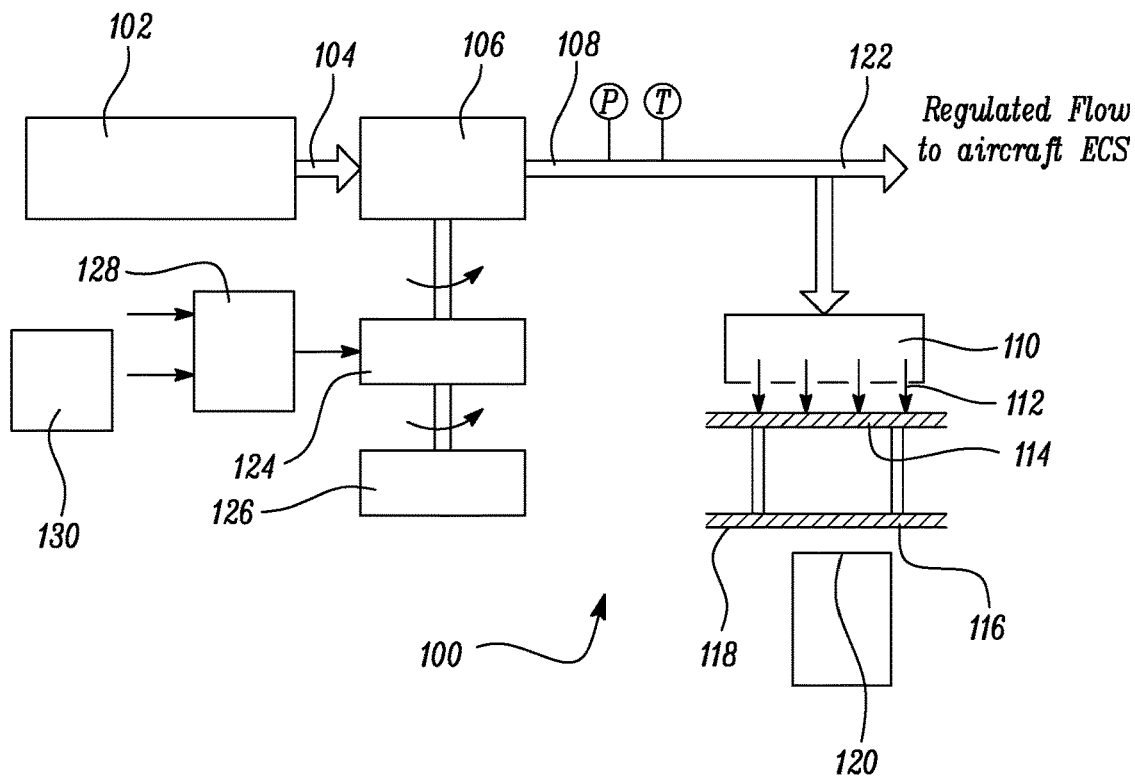
FIG. 5 is schematic view of a tip clearance control system in accordance with an embodiment of the invention.

FIG. 5 shows a tip clearance control system generally provided at 100. The tip clearance control system 100 has a blower fluid collection inlet comprising a scoop 102. The scoop 102 is located on an outer wall (not shown) of a bypass duct (not shown) of a turbofan engine (not shown) downstream of its fan. The scoop 102 feeds a fluid supply passage 104 in the form of a conduit, which in turn feeds a cabin blower compressor 106. At an outlet to the cabin blower compressor 106 is a fluid delivery passage 108 leading to a manifold 110 of cooling nozzles 112. The cooling nozzles are directed at a heat sink 114 in good thermal contact with a casing 116 of the turbofan engine. The casing 116 surrounds a turbine of the engine and has an internal surface 118 facing and in close proximity to blade tips 120 of the turbine. A branch 122 from the fluid delivery passage 108 is in fluid communication with an environmental control system of an aircraft associated with the turbofan engine.

The cabin blower compressor 106 is connected via a driving link to a toroidal continuously variable transmission 124, which is itself connected via a driving link to an accessory gearbox 126 of the engine, which is in turn connected via a driving link to a spool of the engine.

A controller, in this case an aircraft processor 128 is arranged to receive signals from the environmental control system and from an electronic control unit 130 of the engine, the signals being indicative of a demanded change in cabin air pressure and tip clearance cooling air pressure respectively. The aircraft processor 128 is arranged to send signals that adjust the transmission in response to the demands.

In use the cabin blower compressor 106 is driven by the spool of the engine, via the accessory gearbox 126 and transmission 124. The cabin blower compressor 106 compresses air collected by the scoop 102 and delivered by the fluid supply passage 104. A proportion of the compressed air is delivered via the fluid delivery passage 108 to the manifold 110 of cooling nozzles 112. This compressed air is directed into contact with the heat sink 114 by the cooling nozzles 112 whereupon it cools the heat sink 114 and thereby the casing 116, tending to contract it. Thereafter the air is exhausted overboard via an exhaust conduit. The remainder of the compressed air supplied by the cabin blower compressor 106 is delivered via the delivery passage 108 and the branch 122 therefrom to the environmental control system where it is used to pressurise the cabin.

Where the need for a change in cabin pressurisation is sensed/determined, the transmission 124 is adjusted by the aircraft processor 128 to correspondingly increase or decrease the speed of rotation of the cabin blower compressor 106. Similarly where the need for a change in casing 116 cooling is sensed/determined, the engine electronic controller 130 sends a signal to the aircraft processor 128, which in turn correspondingly adjusts the transmission 124 accordingly. Because the transmission 124 provides the sole control mechanism for the flow volume delivered for tip clearance control and cabin pressurisation, a degree of compromise may be required. Thus the aircraft processor 128 may employ a highest or lowest wins logic or else cabin pressurisation requirement wins logic.

Figure 6:
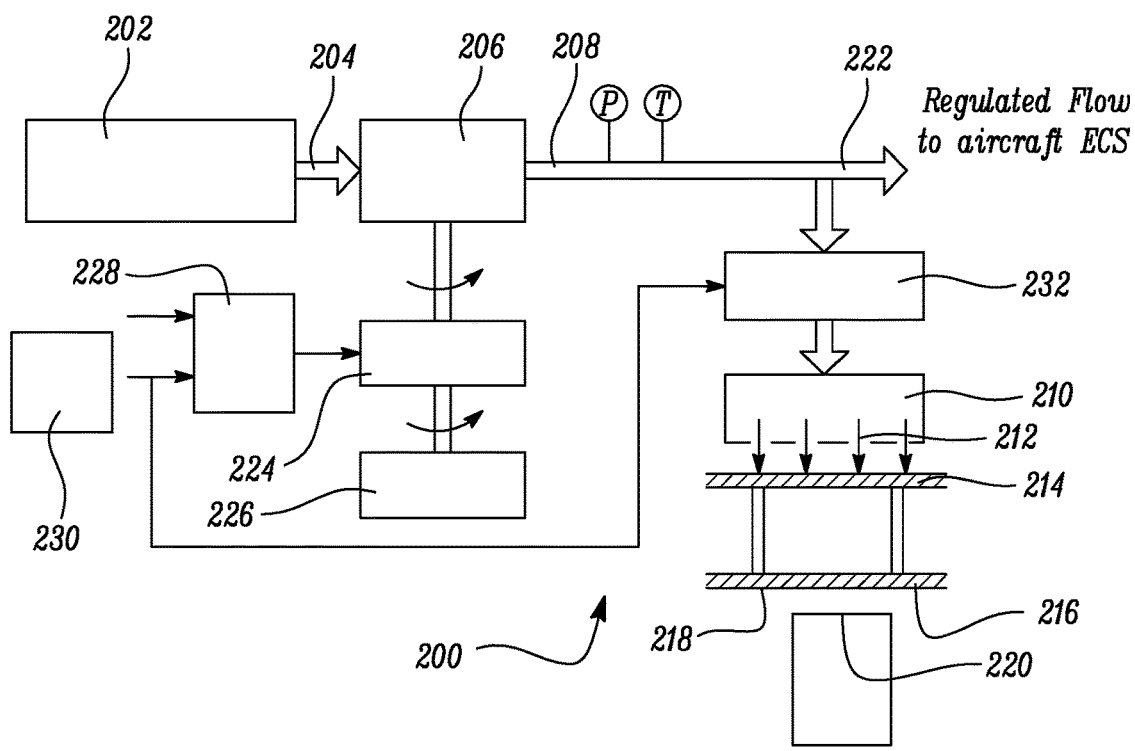
FIG. 6 is schematic view of a tip clearance control system in accordance with an embodiment of the invention.

Referring now to FIG. 6 a tip clearance control system generally provided at 200 is shown. The tip clearance control system 200 is similar to the tip clearance control 100 of FIG. 5 and like features are given like reference numerals in the series 200.

As before there is therefore a blower fluid collection inlet comprising a scoop 202, a fluid supply passage 204 and a cabin blower compressor 206. There is also a fluid delivery passage 208, a manifold 210, cooling nozzles 212, a heat sink 214 and a casing 216. The casing 216 surrounds a turbine of the engine and has an internal surface 218 facing and in close proximity to blade tips 220 of the turbine. As before a branch 222 from the fluid delivery passage 208 in fluid communication with an environmental control system is provided. Similar transmission features are also present (i.e. a toroidal continuously variable transmission 224 and an accessory gearbox 226), as are an aircraft processor 228 and engine electronic control 230.

The only modification is the provision of a tip clearance control modulating valve 232, actuation of which is under the control of the engine electronic control 230. Actuation of the tip clearance control modulating valve 232 varies the volume of compressed air reaching the manifold 210, cooling nozzles 212 and heat sink 214 so as to vary the cooling of the casing 216. The provision of the tip clearance control modulating valve 232 therefore reduces the degree of compromise that must be exercised by the aircraft processor 228 in adjusting the transmission 224 for acceptable tip clearance control cooling and cabin pressurisation. Specifically, even where the speed of the cabin blower compressor 206 is, in view of cabin pressurisation requirements, set higher than desirable for tip clearance cooling purposes, the volume of flow to the heat sink 214 may be limited by appropriate actuation of the tip clearance control modulating valve 232.

Figure 7:
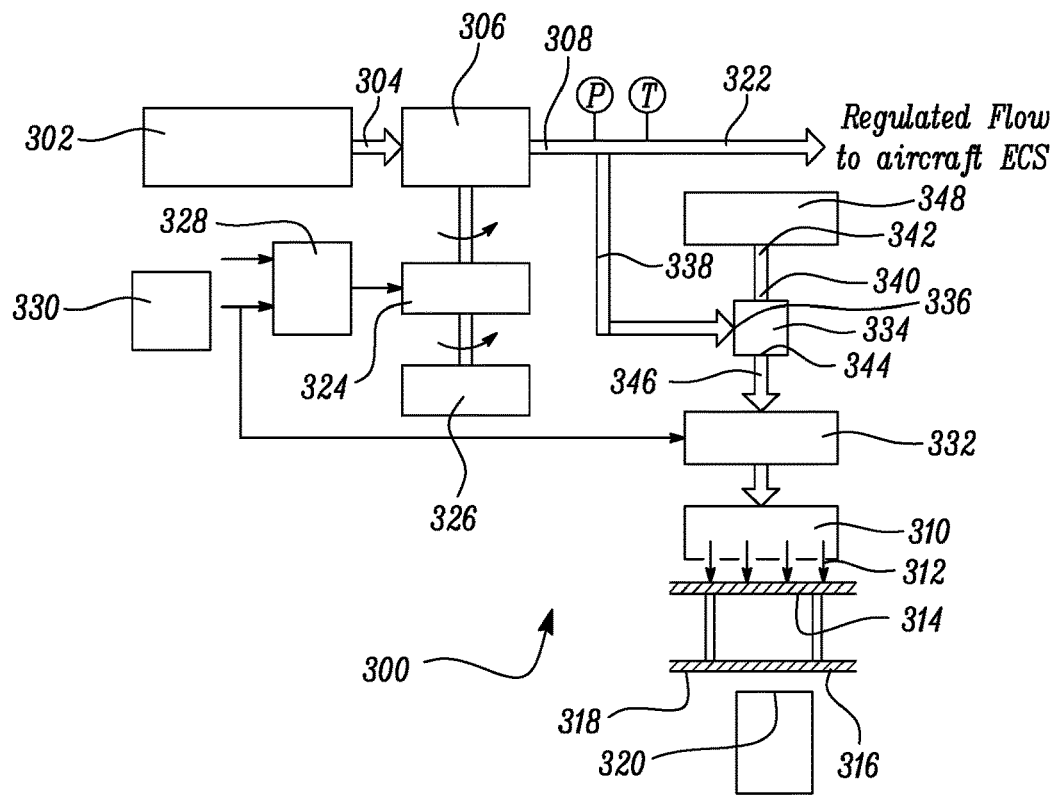
FIG. 7 is schematic view of a tip clearance control system in accordance with an embodiment of the invention.

Referring now to FIG. 7 a tip clearance control system generally provided at 300 is shown. The tip clearance control system 300 is similar to the tip clearance control 200 of FIG. 6 and like features are given like reference numerals in the series 300.

As before there is therefore a blower fluid collection inlet comprising a scoop 302, a fluid supply passage 304 and a cabin blower compressor 306. There is also a fluid delivery passage 308, a tip clearance control modulating valve 332 a manifold 310, cooling nozzles 312, a heat sink 314 and a casing 316. The casing 316 surrounds a turbine of the engine and has an internal surface 318 facing and in close proximity to blade tips 320 of the turbine. As before a branch 322 from the fluid delivery passage 308 in fluid communication with an environmental control system is provided. Similar transmission features are also present (i.e. a toroidal continuously variable transmission 324 and an accessory gearbox 326), as are an aircraft processor 328 and engine electronic control 330.

The only modification is the provision of an injector 334 forming part of the fluid delivery passage 308. The injector 334 has a motive fluid port 336 connected to an upstream portion 338 of the fluid delivery passage 308, an entrained fluid port 340 connected to an entrained fluid passage 342 and an outlet port 344 connected to a downstream portion 346 of the fluid delivery passage 308. The entrained fluid passage 342 has an entrained fluid collection inlet (in this case a further scoop 348) provided in the bypass duct. This arrangement means that not only is compressed air from the cabin blower compressor 306 delivered to the heat sink 314 (when the tip clearance control modulating valve 332 is open), but also air captured by the further scoop 348 and entrained in the injector 334. This may raise the pressure and flow volume available for cooling the casing 316.

Figure 8:
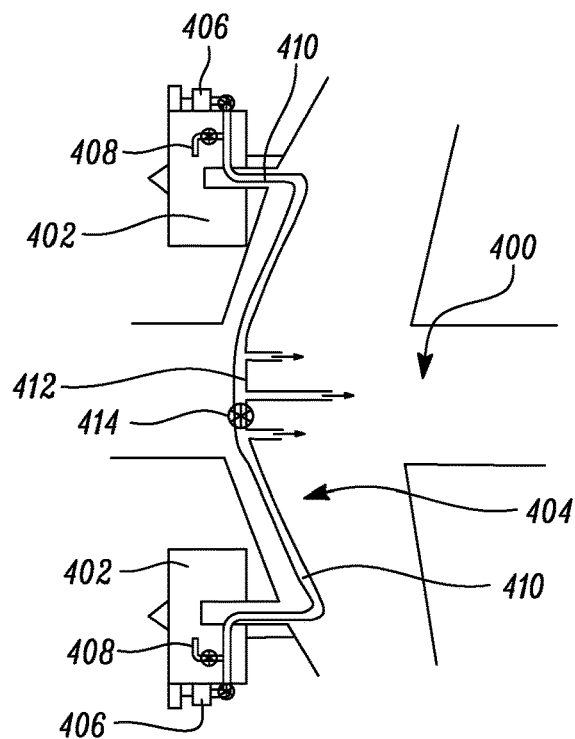
FIG. 8 is schematic view of an aircraft in accordance with an embodiment of the invention.

Referring now to FIG. 8 part of an aircraft is generally shown at 400. The aircraft 400 has two gas turbine engines 402. Each engine 402 is associated with a cabin blower system 404 and broader tip clearance control system similar to those previously described. Each engine 402 therefore has a casing (not shown), a cabin blower compressor 406 a fluid delivery passage 408 and a branch 410 from the fluid delivery passage 408 in fluid communication with an environmental control system of the aircraft 400.

Linking the branches 410 associated with each engine 402 in fluid communication is an inter-engine duct 412. The inter-engine duct 412 is provided with a cross flow valve 414.

In use the inter-engine duct 412 allows air compressed by the cabin blower compressor 406 of one of the engines 402 to deliver air for cooling the casing of the other engine 402. Control of this delivery is undertaken by an aircraft processor of the aircraft 400 via the cross flow valve 414. Thus where there is a failure (or other operational constraint) of one engine 402 or the associated cabin blower system 404 in such a manner that air might still be usefully supplied for cooling its casing from the other engine 402, the cross flow valve 414 may be opened by the aircraft processor. Otherwise the cross flow valve 414 may be maintained closed.

The cabin blower compressor 404 of each engine 402 is arranged such that it has sufficient capacity to meet all normal environmental control system demands, cooling demands for its own casing and cooling demands for the casing of the further engine 402. This fact in combination with the provision of the inter-engine duct 412 may provide a degree of redundancy for tip clearance control in the event of complete or partial failure of an engine.

It will be understood that the invention is not limited to the embodiments above-described and various modifications and improvements can be made without departing from the concepts described herein. By way of example a heat exchanger may be provided in the delivery duct to cool the compressed air before it reaches the casing. Except where mutually exclusive, any of the features may be employed separately or in combination with any other features and the disclosure extends to and includes all combinations and sub-combinations of one or more features described herein.

The invention claimed is:

1. A gas turbine engine comprising:
   a tip clearance control system having:
      a casing arranged about a rotor of a gas turbine engine;
      a fluid delivery passage (1) connected with a cabin of an aircraft so that fluid is allowed to flow to the cabin of the aircraft via the fluid delivery passage; and (2) connected with the casing to allow for fluid to flow to and thermally contact the casing so that thermal energy is transferred from the casing thereby cooling the casing; and
      a cabin blower system comprising a cabin blower compressor, the cabin blower compressor comprising an output that is coupled to the fluid delivery passage.

2. A gas turbine engine according to claim 1 where the cabin blower compressor is driven by a spool of the gas turbine engine.

3. A gas turbine engine according to claim 1 where the speed of rotation of the cabin blower compressor is controlled via a toroidal continuously variable transmission.

4. A gas turbine engine according to claim 3 where the toroidal continuously variable transmission comprises at least one traction drive adapted to transmit drive therethrough; the traction drive comprising first and second toroids, the first and second toroids each having one of a pair of opposed toroidal surfaces and there being a set of rotatable variators disposed between the opposed toroidal surfaces and where further the first and second toroids are separated and are drivingly engaged via a wheel of each variator, each wheel running in use on both of the opposed toroidal surfaces.

5. A gas turbine engine according to claim 4 where the transmission further comprises a bypass drive transmission parallel to the toroidal continuously variable transmission.

6. A gas turbine engine according to claim 5 where the transmission is arranged to combine drive from the toroidal continuously variable transmission and the bypass drive transmission and deliver it to the cabin blower compressor.

7. A gas turbine engine according to claim 3 where the tip clearance control system comprises a controller arranged to control the transmission to determine the rate at which the cabin blower compressor is driven in accordance with the requirements for cabin pressurization and tip clearance control cooling.

8. A gas turbine engine according to claim 3 where the transmission is the sole control mechanism for flow volume delivered to the casing.

9. A gas turbine engine according to claim 1 where a tip clearance control modulating valve is provided in the fluid delivery passage.

10. A gas turbine engine according to claim 1 where the tip clearance control system comprises an injector having a motive fluid port, an entrained fluid port and an outlet port, where the injector forms part of the fluid delivery passage and is connected to an upstream portion thereof at its motive fluid port and to a downstream portion thereof at its outlet port and where further an entrained fluid passage connects the entrained fluid port and an entrained fluid collection inlet.

11. A gas turbine engine according to claim 1 where the tip clearance control system comprises a heat exchanger arranged to cool the fluid delivered to the casing.

12. An aircraft comprising a gas turbine engine according to claim 1.

13. An aircraft comprising at least two gas turbine engines according to claim 1.

14. An aircraft according to claim 13 where the aircraft comprises at least one inter-engine duct via which fluid compressed by the cabin blower compressor of one of the engines is selectively deliverable to the tip clearance control system of another of the engines.

15. A method of operating an aircraft, the aircraft comprising at least two gas turbine engines according to claim 1 and at least one inter-engine duct via which fluid compressed by the cabin blower compressor of one of the engines is selectively deliverable to the tip clearance control system of another of the engines, the method comprising, delivering fluid from one of the engines having an operational cabin blower compressor to the casing of the other engine via the inter-engine duct when the cabin blower compressor of that other engine is operating sub-normally and/or is inoperative.

* * * * *